(12) United States Patent
French

(10) Patent No.: US 7,014,421 B2
(45) Date of Patent: Mar. 21, 2006

(54) COMPRESSOR

(75) Inventor: Pierre French, Scholes (GB)

(73) Assignee: Holset Engineering Company, Limited, (GB)

( * ) Notice: Subject to any disclaimer, the term of this patent is extended or adjusted under 35 U.S.C. 154(b) by 45 days.

(21) Appl. No.: 10/684,658

(22) Filed: Oct. 14, 2003

(65) Prior Publication Data
US 2004/0115042 A1 Jun. 17, 2004

(30) Foreign Application Priority Data
Oct. 14, 2002 (GB) ................. 0223756

(51) Int. Cl.
F04D 29/02 (2006.01)

(52) U.S. Cl. ..................... 415/197

(58) Field of Classification Search ........... 415/144, 415/146, 196, 197, 206, 213.1; 417/405, 417/407
See application file for complete search history.

(56) References Cited

U.S. PATENT DOCUMENTS

| 2,803,396 | A | | 8/1957 | Darrow |
| 3,391,859 | A | * | 7/1968 | Waldman ............... 415/146 |
| 4,292,807 | A | | 10/1981 | Rannenberg |
| 4,499,732 | A | | 2/1985 | Szczupak et al. |
| 4,768,343 | A | | 9/1988 | Fischer |
| 6,371,722 | B1 | * | 4/2002 | Takahashi ............... 415/113 |
| 6,601,672 | B1 | * | 8/2003 | Liu ........................ 181/290 |

FOREIGN PATENT DOCUMENTS

| DE | 197 54 197 A1 | 6/1999 |
| GB | 808367 | 2/1959 |
| GB | 2 162 581 A | 2/1986 |
| JP | 62-159732 | 7/1987 |

* cited by examiner

Primary Examiner—Thomas E. Lazo
Assistant Examiner—Devin Hanan
(74) Attorney, Agent, or Firm—Krieg DeVault LLP

(57) ABSTRACT

A compressor comprises a compressor wheel (8) mounted for rotation within a compressor housing (4,5), which an annular outlet passage (15) defined between opposing annular wall surfaces. A portion (20) of at least one of the wall surfaces is resiliently flexible such that operational pressure changes within the outlet passage (15) cause the resilient wall surface portion to flex.

22 Claims, 3 Drawing Sheets

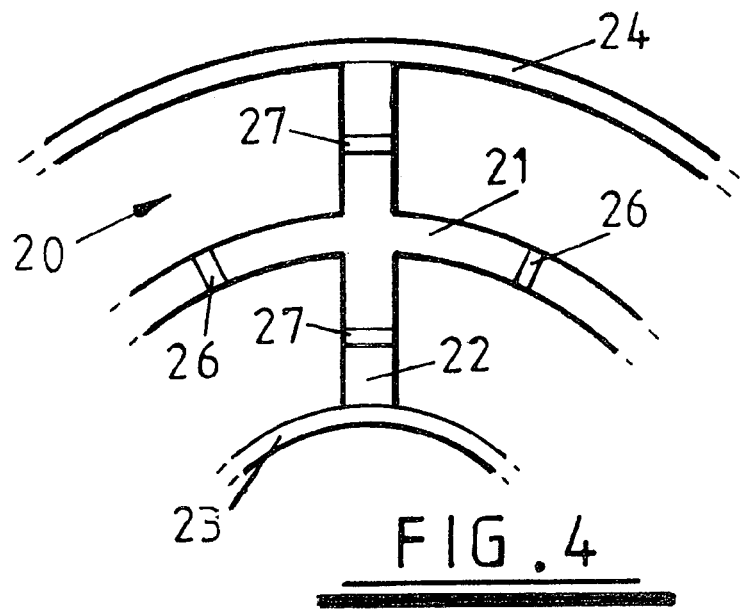
FIG. 4
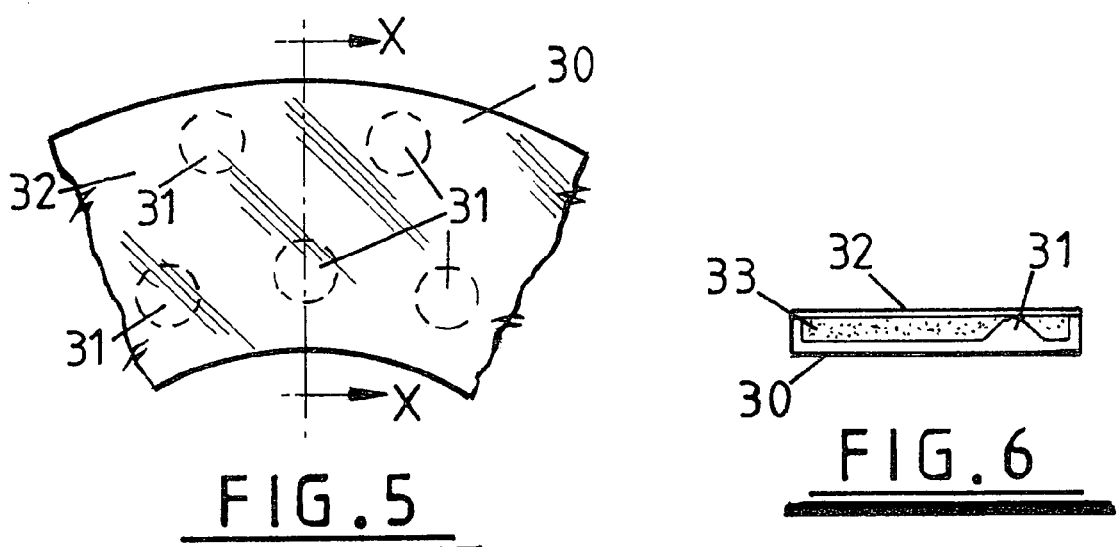
FIG. 5
FIG. 6
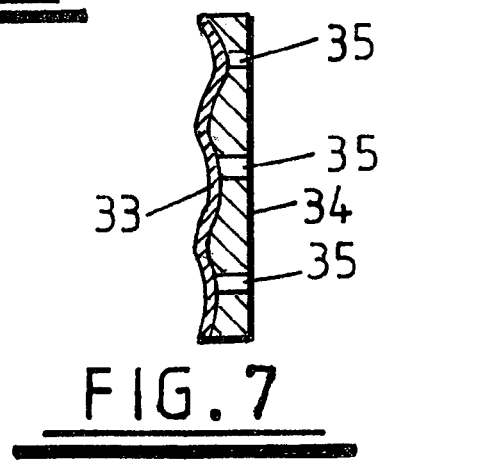
FIG. 7

COMPRESSOR

The present application claims priority to British Patent Application No. 0223756.8 filed Oct. 14, 2002, which is incorporated herein by reference.

The present invention relates to a compressor and particularly, but not exclusively, to a turbocharger compressor.

Turbochargers are well known devices for supplying air to the intake of an internal combustion engine at pressures above atmospheric (boost pressures), and are widely used in automobiles, powered boats and the like as well as industrial power generation. A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

Turbochargers are not only useful in increasing the power output of an internal combustion engine, but also enable the reduction of unwanted emissions by increasing the efficiency of the engine and in particular by matching air flow and fuel flow. For this reason diesel engines, and in particular large diesel engines, are almost always turbocharged.

As combustion engine emission regulations become ever more stringent, there is a corresponding requirement to improve turbocharger efficiency and performance consistency. There are many factors which influence the operation of the turbocharger, including features of the turbine and compressor wheel housings, such as the design and manufacture of the respective inlet and outlets.

The present inventors have determined that compressor efficiency can be significantly compromised by particulate build up on the diffuser portion of the compressor outlet which adversely affects the flow characteristics of the outlet. A particular problem has been identified in engines which re-circulate crank case ventilation (CCV) gases to the engine for combustion.

CCV gas comprises a mixture of air, oil, water and soot. In the past it has been acceptable to simply vent CCV gas to atmosphere. This is no longer the case with current regulations on engine emissions. Increasingly the measure taken to deal with this problem is to pass the CCV gas to the engine for combustion. This method is particularly suited to turbo-charged engines since the low pressure condition at the compressor inlet is ideal for introduction of the CCV gas. Inevitably, however, this means that the CCV gas must pass through the compressor housing.

The inventors have found that circulation of CCV gases through the compressor can result in significant build up of carbon deposits on the diffuser portion of the compressor outlet. That is, carbon particles passing through the compressor housing "burn on" on to the surfaces of the outlet and build up over time. Whilst the initial efficency reduction may be relatively small, the deposits can build up over time to such an extent that the efficiency of the compressor is substantially reduced. It is even possible that over an extended time the diffuser portion of the compressor inlet can become almost fully blocked. Moreover, meeting emissions regulations requires the generation of higher power outputs from engines of a given size, requiring more work from the compressor with the inevitable generation of higher temperatures in the compressor housing which will exacerbate the problem.

It is known to filter the CCV gas before its introduction to the compressor inlet, but existing filter systems are only partially successful at preventing the build up of carbon and other deposits on the compressor outlet walls.

Accordingly, it is an object of the present invention to obviate or mitigate the above problems.

According to the present invention there is provided a compressor comprising a compressor wheel mounted for rotation within a compressor housing, the compressor housing having an annular outlet passage surrounding the compressor wheel and defined between opposing annular wall surfaces, wherein a portion of at least one of said wall surfaces is resiliently flexible such that operational pressure changes within said outlet passage cause the resilient wall surface portion to flex.

A flexing of the resilient wall portion will act to break up and dislodge any particulate deposits, such as carbon deposits, which form in the outlet passage of the compressor. Dislodged particles will then pass through to the engine for combustion and will not interfere with normal operation of the engine (or indeed any other in line components such as a turbocharger after cooler).

With the present invention a filter could still be installed upstream of the compressor to filter the CCV gas but this is not absolutely necessary.

A further advantage of the present invention is that the particulate deposit removal is a passive operation, the resilient wall portions naturally flexing with pressure changes within the compressor outlet.

Preferably the annular wall surfaces on both sides of the outlet passage have such resilient portions, and preferably the resilient portions are annular and extend over a major radial extent of the respective wall surfaces.

In preferred embodiments of the invention the resilient wall surface portions are provided by respective resilient members inset into recesses defined in a wall of the housing, and lying flush with the surrounding housing wall surface. For instance, the resilient members may comprise a diaphragm which flexes with pressure changes within the compressor outlet.

Additional preferred and advantageous features of the present invention will be apparent from the following description.

Specific embodiments of the present invention will now be described, by way of example only, with reference to the accompanying drawings, in which:

FIG. 4 is a rear view of a section of a flexible wall member of the compressor of FIG. 3;

FIG. 5 is a front view of a portion of an alternative flexible annular wall member in accordance with the present invention;

FIG. 6 is a radial cross-section of the wall member of FIG. 5 taking on the line x—x of FIG. 5; and FIG. 7 is a radial cross-section of another alternative flexible annular wall member in accordance with the present invention.

Figure 1:
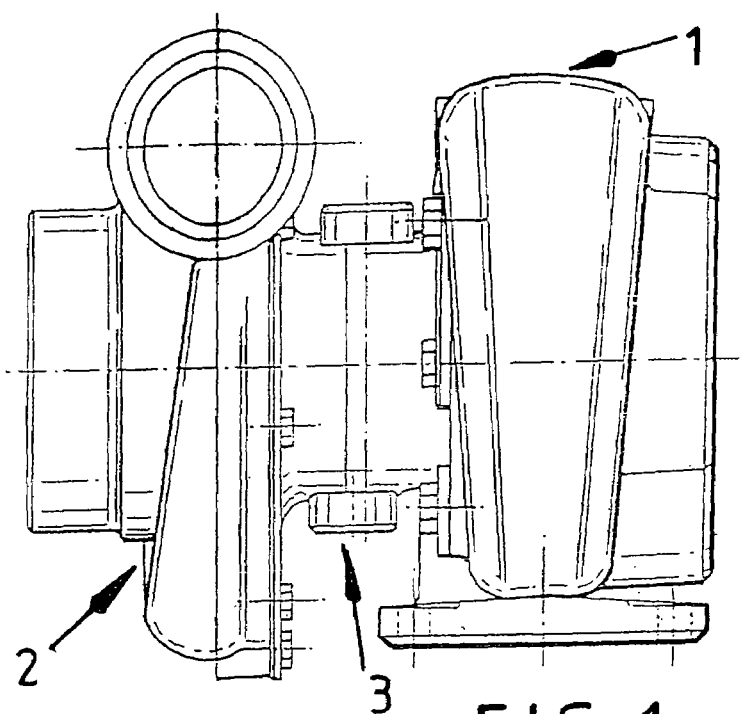
FIG. 1 is an external view illustrating the major components of a conventional turbocharger.

Referring to the drawings, FIG. 1 illustrates a conventional centrifugal type turbocharger comprising a turbine indicated generally by the reference numeral 1, a compressor indicated generally by the reference numeral 2, and a central bearing housing indicated by the reference numeral 3. Since the present invention relates to the construction of the compressor, there will be no detailed description of the turbine or bearing housing components (which may be entirely conventional).

Figure 2:
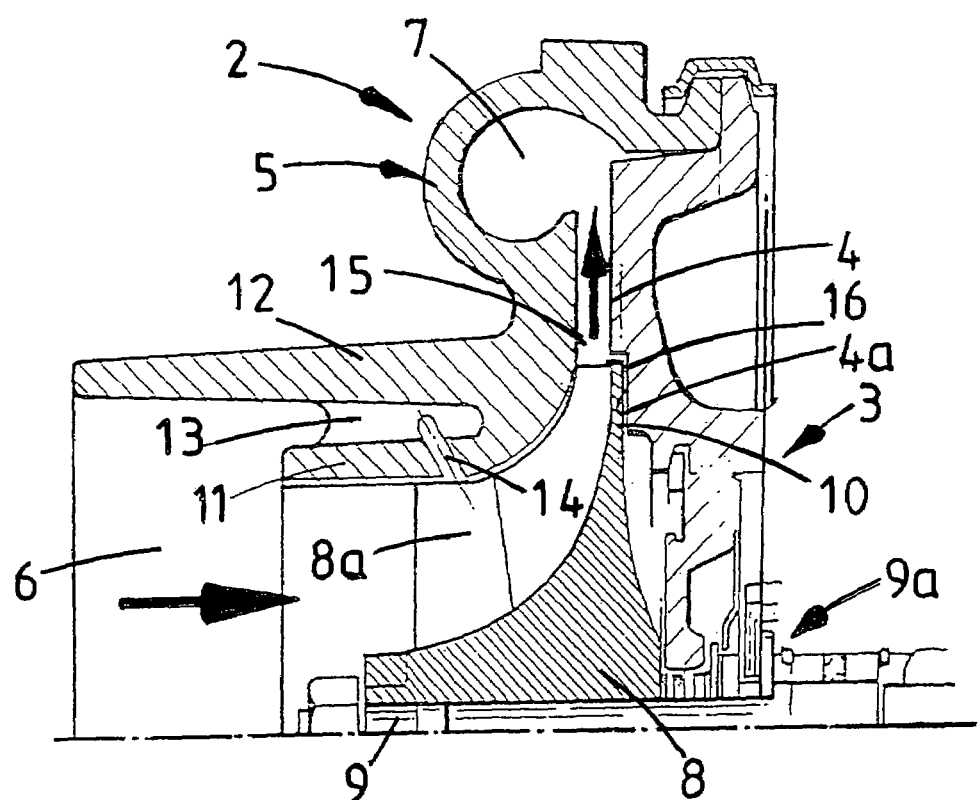
FIG. 2a is a cross-section through a part of the turbocharger of FIG. 1 showing details of the conventional compressor.

Referring to FIG. 2, this shows a cross-section through part of the compressor 2 of the turbocharger of FIG. 1 from which it can be seen that the compressor comprises a housing defined in part by a diffuser section 4 (which is part of the bearing housing casting 3) and a compressor cover 5 which defines an inlet 6 and an outlet volute 7. A compressor wheel 8 is mounted for rotation about a shaft 9 which extends through the bearing housing 3 to the turbine 1. The compressor end bearing and oil seal arrangements are indicated generally by the reference 9a. The compressor wheel 8 comprises an array of blades 8a supported by a back disc 10 which is recessed into the diffuser section 4 in the region 4a.

The illustrated compressor is of a map width enhanced type in which the inlet 6 comprises a tubular inlet portion 11 around which extends a tubular intake portion 12 defining an annular chamber 13 therebetween. An annular slot 14 is defined through the tubular inlet portion 11 so that the chamber 13 communicates with an inducer portion of the compressor housing swept by the compressor blades 9. the outlet to the compressor volute 7 is via a diffuser passage 15, defined between facing annular portions of the compressor cover 14 and diffuser section 4 of the bearing housing 3. The diffuser passage 15 is thus an annular passage surrounding the tips of the compressor blades 9.

The present invention relates to the construction of the compressor outlet and in particular the diffuser portion or passage 15 (rather than the volute 7) and thus there will be no further description of the compressor inlet. However, it should be noted that whilst the illustrated embodiment of the invention is a map width enhanced compressor, this feature is not relevant to operation of the invention which may be applied to compressors having other conventional inlet forms.

Figure 3:
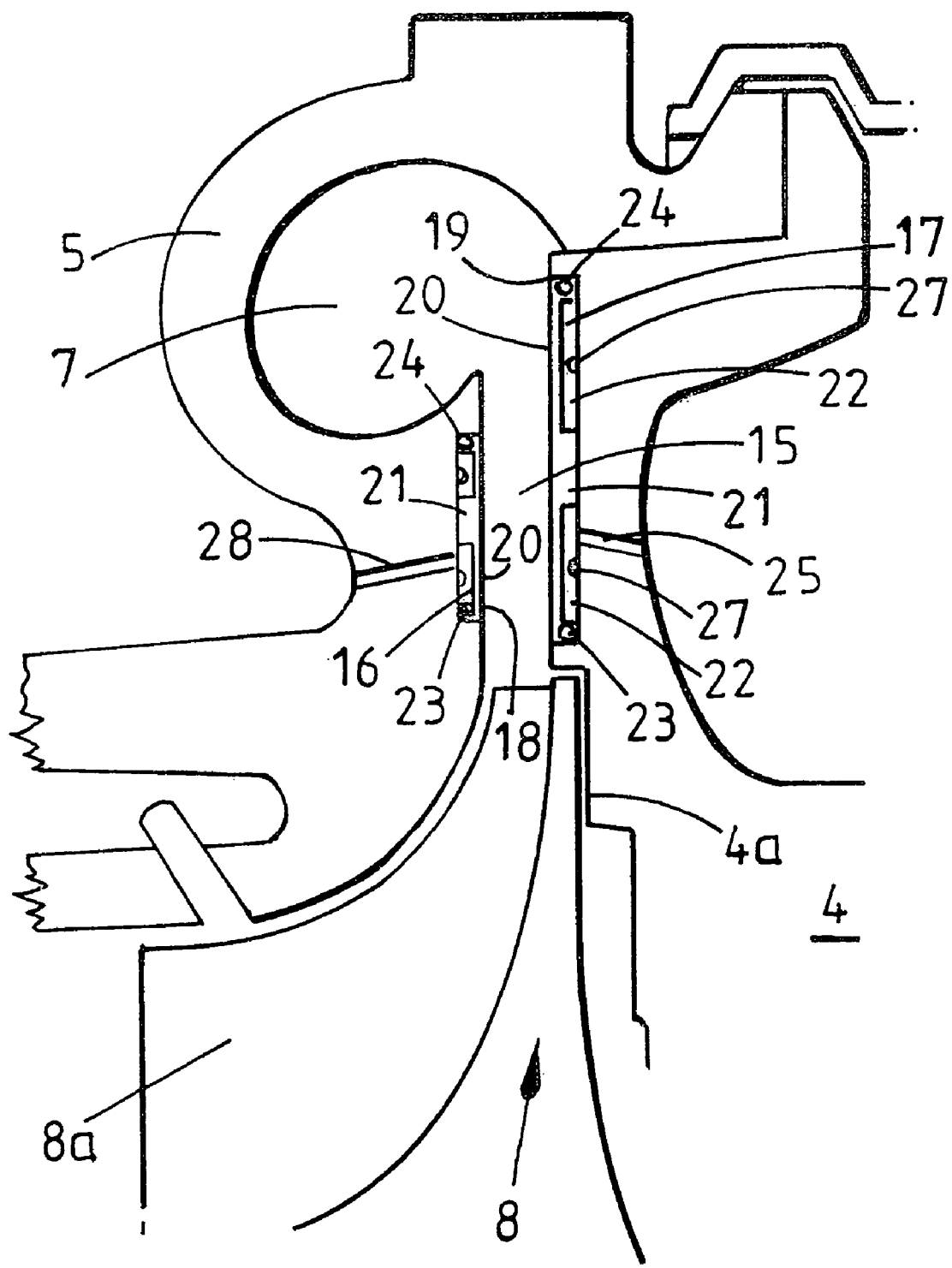
FIG. 3 illustrates a modification of a compressor of FIG. 2 in accordance with a first embodiment of the present invention.

Referring now to FIG. 3, this illustrates a modification of the compressor of FIG. 2 in accordance with the present invention. FIG. 3 is an enlarged view of the compressor outlet portion showing the structure of the diffuser passage 15 in greater detail. In accordance with the present invention the walls of the diffuser passage 15 (i.e. the facing surfaces of the diffuser section 4 and compressor cover 5) have resilient portions provided by annular diaphragm members 16 and 17 which are inset into respective annular recesses 18 and 19 formed in the compressor cover 5 and diffuser section 4.

FIG. 4 shows a rear view of a section of one of diaphragm members 16, 17 which is moulded from rubber or a similar resiliently flexible material, and comprises a diaphragm 20 which has thickened reinforcing circumferential and radial rib portions 21 and 22. The radially inner and outer circumferential edges of the diaphragm 20 are also thickened and moulded around reinforcing steel rings 23 and 24 (it will be appreciated that the rings 23 and 24 may be made of other, preferably metallic materials).

The diaphragm member 17 is a press fit within the recess 19 so that the surface of the diaphragm 20 lies flush with surrounding surface portions of the diffuser section 4. A pressure bleed duct 25 is provided through the wall of the diffuser section 4 communicating with the air gap defined within the recess 19 behind the diaphragm 20. The pressure bleed duct 25 may open to atmosphere or may communicate with another portion of the compressor stage (such as the inlet 6, a location behind the compressor wheel 8, or the compressor discharge pipe where there will be additional pressure movement sufficient to flex the diaphragm member 17. Compressor equalisation ducts 26, 27 are provided through the reinforcing ribs 21, 22 to allow the pressure to equalize around the whole of the annular recess 19.

The construction of diaphragm member 16 is essentially identical to that of diaphragm member 17, except that diaphragm member 16 has a reduced radial dimension. A pressure bleed passage 28 is provided through the compressor cover 5 communicating with the air gap defined behind the diaphragm member 16.

In operation, changes in the pressure of the boost air supplied to the engine over the engine cycle will cause the resilient diaphragms 16, 17 to flex. This will have the effect of dislodging any carbon or other particle deposits which may form on the diaphragm surfaces. Any such deposits dislodged from the surface will simply be passed to the engine and will be sufficiently small as to have no detrimental effect on the operation of the engine (or any other connected components, such as a turbocharger after cooler).

The provision of the bleed passages 25, 28 and pressure equalisation ducts 26, 27 ensure that air pockets behind the diaphragms do not hinder the ability of the diaphragms to flex resiliently as necessary.

It will be appreciated that the compressor outlet passage walls may be provided with the required flexibility/resilience in a variety of ways. For instance, one alternative form of diaphragm member is illustrated in FIGS. 5 and 6. The illustrated diaphragm member comprises an annular ring 30 provided with raised portions 31, which may be for instance moulded from rubber or similar material. The outer surface of the member, which in situ will define the surface of the passageway, is provided by a thin membrane 32 fabricated from an appropriate elastomer. The gap beneath the membrane and between the raised portions is filled with a compressible sponge elastomer 33 which accommodates the required flexing of the surface membrane 32.

Another alternative form of diaphragm member is illustrated in FIG. 7. This comprises a thin flexible diaphragm 33 mounted to a backing material made of foam or similar material which allows the diaphragm to undulate as a result of pressure changes across the diaphragm between the diffuser section of the compressor and one or more vent holes 35 (which again may communicate with atmosphere or with another part of the compressor stage as mentioned above). The diaphragm 33 may be formed of a suitable thin elastomer and the backing 34 may be formed of a suitable compressible sponge elastomer.

Possible modifications of the diaphragm structures described above, and other possible alternative structures for providing the compressor outlet passageway with resilient wall portions which flex during normal operation of the compressor to dislodge any deposited materials, will be evident to the appropriately skilled person.

What is claimed is:

1. A compressor comprising a compressor wheel mounted for rotation within a compressor housing, the compressor housing having a fixed geometry annular outlet diffuser surrounding the compressor wheel and defined between opposing annular wall surfaces, wherein a portion of at least one of said wall surfaces is resiliently flexible such that operational pressure changes within said outlet diffuser cause the resilient wall surface portion to flex.

2. A compressor according to claim 1, wherein both said annular wall surfaces have resilient portions.

3. A compressor according to claim 1, wherein the resilient portion of one wall surface or both wall surfaces is annular.

4. A compressor according to claim 1, wherein each annular wall surface is substantially planar over a radial dimension, and said flexible surface portion of one annular wall surface or both annular wall surfaces extends over a major portion of said radial dimension of the respective wall surface.

5. A compressor according to claim 1, wherein the resilient portion of one wall surface or both wall surfaces comprises a respective resilient member inset into a recess defined in a wall of the housing.

6. A compressor according to claim 5, wherein one resilient member or both resilient members presents a surface which is substantially flush with the surrounding surface of the respective housing wall.

7. A compressor according to claim 5, wherein one resilient member or both resilient members comprises a resilient diaphragm.

8. A compressor according to claim 7, wherein an air gap is defined within the recess behind the diaphragm, and one or more pressure bleed passages are provided in communication with said air gap to accommodate flexing in the diaphragm without significant pressure change within said air gap.

9. A compressor according to claim 8, wherein a diaphragm is supported on reinforcing radial and/or circumferential ribs.

10. A compressor according to claim 9, wherein said diaphragm and reinforcing ribs are integrally moulded with one another.

11. A compressor according to claim 5, wherein one resilient member or both resilient members is annular.

12. A compressor according to claim 9, wherein the diaphragm is annular and pressure equalisation ducts are provided through at least one reinforcing rib to equalise pressure in the air gap behind the diaphragm around the entire annular extent of the diaphragm.

13. A compressor according to claim 5, wherein said resilient member comprises a diaphragm supported on compressible foam to accommodate said flexing.

14. A compressor according to claim 13, wherein said resilient member comprises an annular support member, said foam being sandwiched between said support member and said diaphragm.

15. A compressor according to claim 14, wherein said support member includes raised portions which extend through said foam layer and directly support the diaphragm.

16. A compressor according to claim 1, wherein each annular wall surface is substantially planar over a radial dimension, and said flexible surface portion of at least one of the annular wall surfaces extends over a major portion of said radial dimension of the respective wall surface and wherein the resilient portion of at least one of the wall surfaces comprises a respective resilient member inset into a recess defined in a wall of the housing.

17. A compressor according to claim 16, wherein each resilient member presents a surface which is substantially flush with the surrounding surface of the respective housing wall.

18. A compressor comprising a compressor wheel mounted for rotation within a compressor housing, the compressor housing having an annular outlet passage surrounding the compressor wheel and defined between opposing annular wall surfaces, wherein a portion of at least one of said wall surfaces is defined by a first side of a resilient diaphragm inset into a respective recess defined in a wall of the housing, and one or more gas passages communicate with said recess for connection to a variable pressure region of the compressor to communicate pressure changes to a second surface of the diaphragm, such that changes in pressure to either side of the diaphragm cause the diaphragm to flex.

19. A compressor according to claim 18, wherein each diaphragm is annular.

20. A compressor according to claim 18, wherein both said annular wall surfaces have portions defined by a respective diaphragm.

21. A compressor according to claim 18, wherein said first surface of each diaphragm is substantially flush with the surrounding surface of the respective housing wall.

22. A compressor according to claim 7, wherein each diaphragm is mounted on a respective support inset into the respective recess and fabricated from a resiliently compressible material.

* * * * *